United States Patent [19]

Ninomiya et al.

[11] 4,394,694
[45] Jul. 19, 1983

[54] TAPE SYNCHRONIZING APPARATUS

[75] Inventors: Ichiro Ninomiya, Kanagawa; Jun Takayama, Tokyo, both of Japan

[73] Assignee: Sony Corporation, Tokyo, Japan

[21] Appl. No.: 189,576

[22] Filed: Sep. 23, 1980

[30] Foreign Application Priority Data

Sep. 27, 1979 [JP] Japan ............................ 54-124368
Nov. 19, 1979 [JP] Japan ............................ 54-149859

[51] Int. Cl.³ .................... G11B 27/00; H04N 5/78
[52] U.S. Cl. ................................ 360/14.3; 360/73; 360/74.4
[58] Field of Search ............... 360/10, 14, 71, 72.2, 360/73, 74.4, 74.1, 10.1, 10.3, 14.1, 14.2, 14.3

[56] References Cited

U.S. PATENT DOCUMENTS

| | | | |
|---|---|---|---|
| 3,911,488 | 10/1975 | Wood et al. ........................... | 360/71 |
| 4,001,882 | 1/1977 | Fiori et al. ........................... | 360/14.1 |
| 4,115,819 | 9/1978 | Shigeta ................................. | 360/14 |
| 4,163,263 | 7/1979 | Rotter .................................. | 360/14 |
| 4,175,267 | 11/1979 | Tachi ................................. | 360/14 X |
| 4,195,317 | 3/1980 | Stratton ............................... | 360/14 |
| 4,210,939 | 7/1980 | Ninomiya et al. .................... | 360/14 |
| 4,267,564 | 5/1981 | Flores ................................. | 360/74.1 |
| 4,272,790 | 6/1981 | Bates .................................. | 360/14 |
| 4,318,140 | 3/1982 | Shigeta ............................... | 360/10.3 |

*Primary Examiner*—Bernard Konick
*Assistant Examiner*—Donald McElheny, Jr.
*Attorney, Agent, or Firm*—Lewis H. Eslinger; Alvin Sinderbrand

[57] ABSTRACT

An editing system employing a video tape recorder (VTR) of this type in which a rotary magnetic video head is attached to a bi-morph leaf or the like so that the VTR can perform in any one of a plurality of special reproducing modes such as a slow motion mode, fast motion mode or the like without the generation of any guard band noise includes a helical scan VTR, which is adapted to carry out the special reproduction modes and is used for reproducing video signals from an original tape, the helical scan video tape recorder including a time code reader for reading out time code signals recorded on the original tape, a reference time generator, which may be another VTR, for generating a reference time code, a memory for storing certain of the time code signals corresponding to an in-point of the original tape (that is, a starting point for playing information signals recorded on the video tape), a VTR controller for setting the direction and speed of travel of the video tape at the in-point, and a central processing unit for stopping the video tape at a pre-roll point with the distance between the in-point and pre-roll point being determined as a function of the set direction and speed of travel of the video tape at the in-point so that during an editing operation, the pore-roll point is changed in accordance with the reproduction mode requested in the editing range, and the reproduction mode used, namely, the tape speed used, after the editing range, is changed based upon data previously stored in the memory during a trial run editing operation.

7 Claims, 3 Drawing Figures

TAPE SYNCHRONIZING APPARATUS

BACKGROUND OF THE INVENTION

1. Field of the Invention

The present invention relates generally to a tape synchronizing apparatus for a video tape recorder, and, more particularly, is directed to a video tape synchronizing apparatus for a video tape recorder that is adapted to perform in any of a plurality of special reproduction modes.

2. Field of the Invention

There has recently been proposed, an auto track scanning system for use in a 1 inch helical scan video tape recorder (VTR). The auto track scanning system provides that a rotary video head is secured to a rotary drum by means of a bi-morph leaf whereby the rotary video head correctly scans a recorded track on a tape even though the tape running speed is changed to other than normal speed. In practice, saw-tooth wave signals are generated in response to the various tape running speeds upon reproduction and are applied to the bi-morph leaf whereby the scanning angle of the rotary video head relative to a video tape is correctly positioned on the recorded track of the video tape so that the rotary video head correctly scans the entire recorded track.

One example of the above-described VTR is described in U.S. Pat. No. 4,163,993. However, such prior art synchronizing system for VTRs cannot simultaneously carry out a reproduction operation in a desired mode at a predetermined time and be used for an editing operation, due to the fact that the above-described VTR can not perform a synchronous operation.

Therefore, for synchronous operation, an operator must operate the above-described VTR manually to provide a picture reproduced in one of the special modes such as slow, still or other modes in a live program.

OBJECTS AND SUMMARY OF THE INVENTION

Accordingly, it is an object of the present invention to provide a novel synchronous control apparatus for a video tape recorder (VTR) that avoids the above-described difficulties encountered with the prior art.

Another object of the invention is to provide a synchronous control apparatus for use in a VTR of the type which is adapted to carry out any one of a plurality of special reproduction modes such as slow motion mode, fast speed mode and the like.

A VTR with which the present invention is adapted to be used is one where a rotary magnetic head is mounted, for example, on a bi-morph leaf and a picture is reproduced in a slow or fast motion mode without the generation of guard-band noises.

When synchronous operation is carried out by the above-described VTR, the length of tape between an in-point (editing point) and a pre-roll point is varied in accordance with a tape running speed required at the in-point. In the VTR, when the tape is driven to the in-point from the pre-roll point at the tape speed required at the in-point, the tape can be always positioned from the pre-roll point to the in-point at a predetermined time or real time.

Further, after the in-point, if the tape speed is desired to be changed, control data for the tape speed relative to time is preliminarily written in a memory during a trial run. Then, during the synchronous operation, the control data is sequentially read out from the memory to thereby control the tape speed after the in-point.

The present invention can be applied to the case where the output from a VTR is required to be broadcast at a predetermined time so as to perform a tape editing operation at such time.

In accordance with an aspect of the present invention, a video tape synchronizing system for a helical scan video type recorder which uses a video tape having time code signals recorded thereon and which is adapted to perform special reproducing functions, includes:

reference time generating a means for generating reference time code;

time code reader means for reading out the time code signals recorded on the video tape which is used in the helical scan video tape recorder;

memory means for storing certain of the time code signals corresponding to an in-point of the video tape, wherein the in-point indicates a starting point for playing back information signals from the video tape;

selecting means for setting a direction and a speed of travel of the video tape at the in-point; and stopping means for stopping the video tape at a pre-roll point, with the distance between the in-point and the pre-roll point being determined as a function of the set predetermined direction and speed of travel of the video tape at the in-point.

The above, and other objects, features and advantages of the present invention will be apparent in the following detailed description of an illustrative embodiment of the invention which is to be read in connection with the accompanying drawings.

DESCRIPTION OF THE PREFERRED EMBODIMENT

Figure 1:
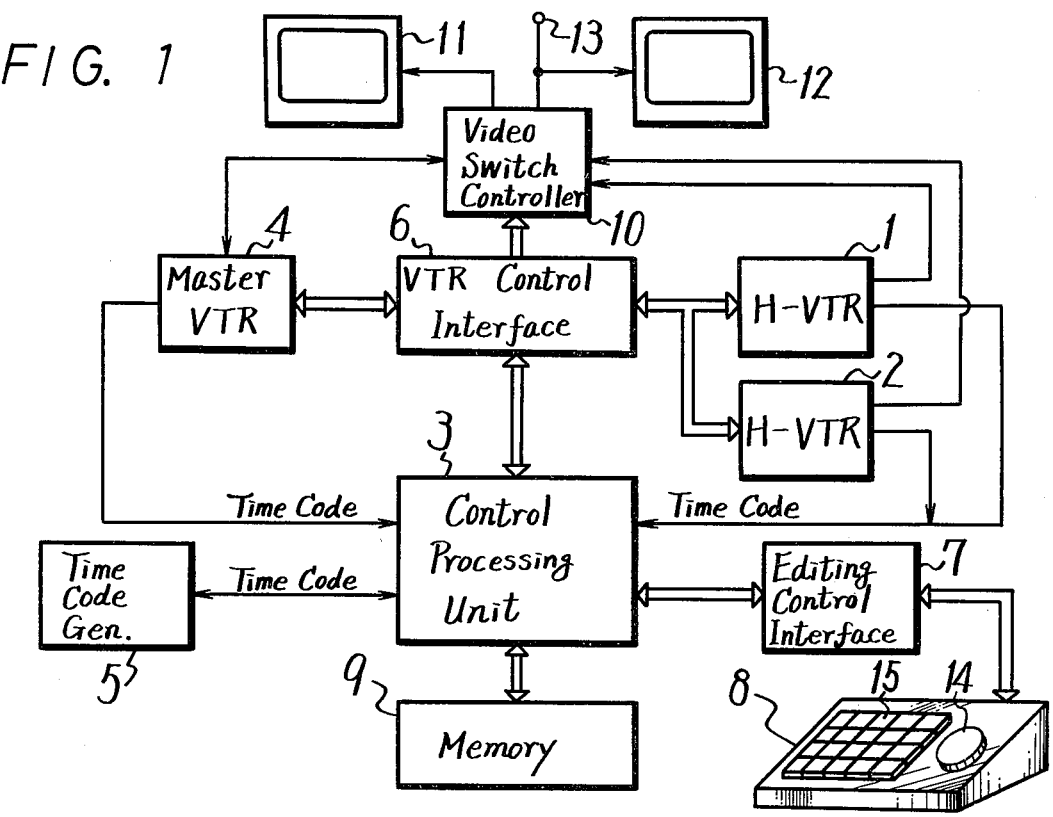
FIG. 1 is a block diagram of a tape synchronizing apparatus according to one embodiment of the present invention.

Before preceeding with a description of the present invention, a general synchronous tape editing operation will be described.

In general, for editing a video tape, a desired portion of an original video tape is reproduced onto a master tape at a desired portion thereof. A time code signal is generally recorded on a video tape in the longitudinal direction thereof for indicating and detecting the tape position (tape time). Thus, the time code data for the editing start point, that is, the in-point of the original tape, and the time code data for the editing start point of the master tape are stored in a memory of an editing apparatus.

Therefore, before start of the actual editing operation, an in-point is determined for use in each of VTRs and then each tape is positioned at a pre-roll point in each of the VTRs. The pre-roll point is a tape position that is ahead of the in-point by, for example, 5 seconds of tape running time. Thus, during the editing operation, the tape begins running from the pre-roll point in each of the VTRs.

When the two VTRs used with the original and master tapes are started, time codes are read from the respective tapes of the VTRs. The difference between each of the read-out time codes and the time code at each of the respective determined in-points is calculated, and the running of the original tape, that is, the phase thereof, is controlled so that the values of the above differences are the same. When the differences are both zero, the VTR for the master tape is operated in its recording mode to record therefrom a desired video signal reproduced from the original tape.

In other words, during the time period within which the pre-roll portion of each tape is running past the heads of the VTRs, a control operation is carried out so that the values of the time codes to the respective registered in-points are made equal. Since a time-code is provided corresponding to every frame of a picture, the time intervals, within which the respective tapes arrive at their in-points are made equal and frame synchronization is established by controlled movements of the two tapes. Therefore, synchronizing signals are continuous from the video signal previously recorded on the master tape and the video signal newly recorded from the original tape so that the editing operation can be performed with no disturbance.

Similarly, the video signal from the original tape can be reproduced at a specified time during a broadcast. In such case, a time code generator is provided and registration between a desired reproducing time in the reference time code and in the time code at the starting point of a desired video signal on the original tape is obtained. Thus, the original tape is first rewound by a predetermined amount and reproduction of the video signal from the original tape begins at a predetermined time before the desired reproducing period so that reproduction of the video signal from the original tape is carried out at the desired time with no disturbance.

With a VTR, it is possible that the tape is transported during reproduction at a speed different from that during the recording operation, for example, during slow motion reproduction, fast speed reproduction, still motion reproduction and the like. In such case, a position changing means, such as an electro-mechanical conversion element or the like, may be provided in connection with the reproducing head to ensure that the head is always tracking correctly. In this manner, the VTR can deliver a normal video signal even with the above special reproducing modes.

Referring now to the drawings, and initially to FIG. 1 thereof, one embodiment of a synchronizing and/or editing apparatus according to this invention for use with the above described VTR, and the operation thereof, will now be described.

In FIG. 1 helical scan type video tape recorders (H-VTRs) 1 and 2 are provided in which video signals from original tapes are reproduced, respectively. Fundamentally, one H-VTR is sufficient for the present invention, although more than one H-VTR may be used. In this case, one of the H-VTRs, for example, H-VTR 1 is adapted to perform special reproduction operations, such as slow, still made reproduction and the like, as set forth above.

Each of H-VTRs 1 and 2 includes a time code head and a time code reader, and the time code read from the original tape of each of the H-VTRs is supplied to a central processing unit (CPU) 3.

A master recording VTR 4 having a master tape loaded therein is also provided, although it should be appreciated that any desired number of master VTRs 4 may be provided, even though only one master VTR 4 is shown in FIG. 1. The master VTR 4 also includes a time code reader (circuit), and the read-out time code therefrom is also fed to CPU 3.

A reference time code generator 5 is also provided which supplies a reference time code to CPU 3. It should be appreciated that it is possible to preset the content of reference time code generator 5 is preset at a predetermined value by a signal from CPU 3. CPU 3 supplies a tape running control signal and a REC/PB (record/playback) control signal to the respective VTRs through a VTR control interface 6, and the respective VTRs, in turn, each supply an operating condition signal to CPU 3 through VTR control interface 6.

Data signals relating to the speed ratio x of the requested tape speed to the normal tape speed at the in-point of the original tape, a time code $T_{cx}$ at the in-point of the original tape corresponding to a desired video signal to be reproduced, a time code $T_{cr}$ at the desired reproduction time or in-point of the master tape and other signals are supplied from a VTR controller 8 to CPU 3 through an editing control interface 7.

A memory 9 is also provided for storing an operation program and other data used by CPU 3. In particular, CPU 3 carries out its processing operation in response to the signals from memory 9 which, in turn, stores data from CPU 3.

Figure 2:
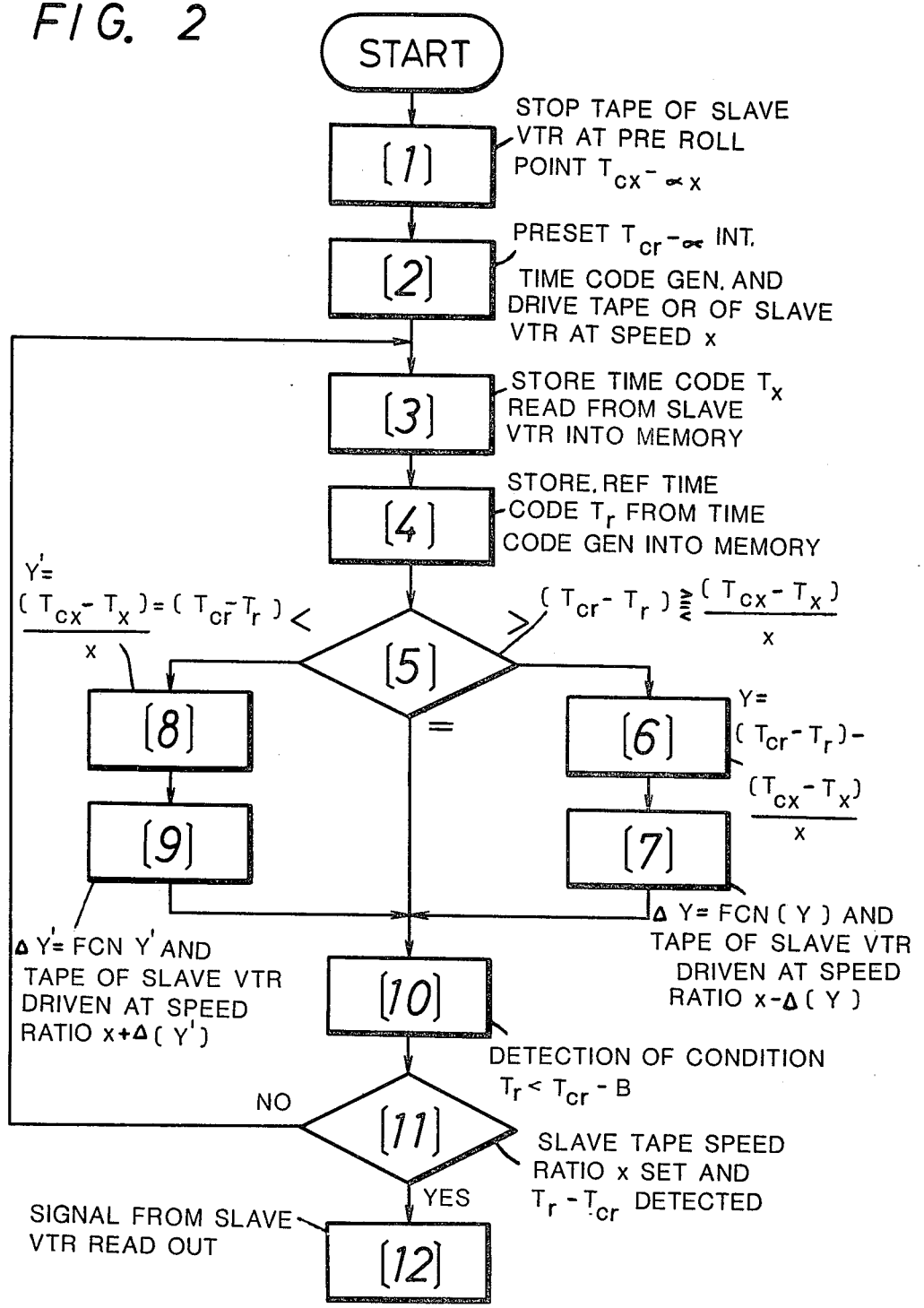
FIG. 2 is a flow chart of a processing program used for explaining the operation of the invention during reproduction.

For example, in a portion of memory 9 written a processing program used by CPU 3 such as shown in the flow chart of FIG. 2. In this example, the program is such that the video signal from the original tape is reproduced at a desired time by utilizing the reference time code from time code generator 5. In this case, the reproduced video signal is derived at an output terminal 13.

A video switch controller 10 is also provided which controls the switching of the signals from the respective VTRs to two monitors 11 and 12. Monitor 11 is supplied with the reproduced video signal from master VTR 4 through video switch controller 10, while monitor 12 is supplied with the reproduced video signals from slave VTRs 1 and 2 through video switch controller 10. It should be appreciated that the above-mentioned output terminal 13 receives the same signal from video switch controller 10 as does monitor 12.

After determining the position of the in-point, a search dial 14 of VTR controller 8 is used to change the tape speed of each VTR to a desired value, and a key board 15 of VTR controller 8 includes push-buttons so as achieve proper entry of the in-point and the like or each VTR.

As previously discussed, $T_{cx}$ is the time code at the in-point of the original tape of VTR 1 and $T_{cr}$ is the time code at the in-point of the master tape of master VTR 4, respectively. Accordingly, an example of how VTR 1 is synchronized with a reference time will now be discussed. In this example, the value $T_{cr}-\alpha$ is preset in time code generator 5, where $\alpha$ is a pre-roll time represented by the time code. Thus, in VTR 1, the video tape is first stopped at the pre-roll point, that is, at a position where the time code on the video tape represents a point $T_{cx}-\alpha x=P_{pk}$, where x is the ratio of the requested tape speed at the in-point to the normal tape speed.

The operation of the system shown in FIG. 1 will now be described with reference to the flow chart of FIG. 2. When the system is started, VTR 1 stops the original tape therein at the pre-roll point $P_{pk}=T_{cx}-\alpha x$ during step [1]. Next, the time code $T_{cr}-\alpha$ is preset in time code generator 5 during step [2], and from the time when the real time or reference time reaches the time code $T_{cr}-\alpha$, this time code $T_{cr}-\alpha$ is advanced sequentially. At the same time, VTR 1 starts to drive the original tape therein at a tape speed x times the normal tape speed.

During step [3], the time code from VTR 1 is read out and stored in memory 9 as a read-out time code $T_x$.

During step [4], the time code from time code generator 5 is similarly stored in memory 9 as a reference time code $T_r$.

During step [5], the following condition is determined:

$$(T_{cr} - T_r) \gtreqless \left( \frac{T_{cx} - T_x}{x} \right)$$

When the left side of this relationship is larger than the right side, the following equation is calculated during step [6]:

$$Y = (T_{cr} - T_r) - \left( \frac{T_{cx} - T_x}{x} \right)$$

Then, during step [7], a value $\Delta(Y)$ is provided in association with the value Y calculated above, and the original tape of VTR 1 is driven at a speed determined by $x-\Delta(Y)$, that is, $x-\Delta(Y)$ times the normal tape speed. In particular, when the difference between the left and right sides is large, $\Delta(Y)$ is likewise selected to be large, while when the above difference is small, $\Delta(Y)$ is selected to be small. It is, of course, possible that $\Delta(Y)$ can be selected as a constant value $\Delta$.

When it is determined that the right side of the above relationship is larger than the left side during step [5], the following equation is calculated during a step [8] which follows step [5]:

$$Y' = \left( \frac{T_{cx} - T_x}{x} \right) - (T_{cr} - T_r)$$

Then, during step [9], the tape speed of the original tape in VTR 1 is changed to a speed of $x+\Delta(Y')$ times the normal recording tape speed.

When it is determined during step [5] that both sides of the above relationship are equal, step [5] is followed by a step [10], wherein a determination of the condition $T_r < T_{cr}-\beta$ is carried out. When this condition is established, the tape speed in VTR 1 is changed to a speed corresponding to x times the recording speed, during the next step [11]. Then, during the next step [12], when $T_r=T_{cr}$, the output from VTR 1 is delivered to output terminal 13. In this case, $\beta$ is a time period somewhat longer than the time period within which the speed of the original tape in VTR 1, which is changed to $x+\Delta(Y')$ or $x-\Delta(Y)$ times the recording speed during steps [9] or [7], respectively, returns to its desired speed of x times recording speed during step [11].

When the condition of $T_r=T_{cr}$ is not established during step [11], the operation returns to step [3] to begin again.

It should be appreciated that the above description with reference to the flow chart of FIG. 2 is only a rough flow diagram explanation.

The important feature of the present invention, however, resides in the fact that the pre-roll point is varied in accordance with the requested speed ratio at the in-point. This means that the pre-roll time at a predetermined or real time can be always be fixed or made constant. As described above, the pre-roll point of the original tape is determined by the equation $P_{pk}=T_{cx}-\alpha x$, so that when VTR 1 is operated in the still mode (x=0) from the in-point, VTR 1 stops the original tape precisely at the in-point.

If VTR 1 is operated at twice the normal speed from the in-point, $x=2$ and $p_{pr}=T_{cx}-2\alpha$. The value $\alpha$ may be any desired value but is generally selected, for example, as 5 seconds.

The above discussion is, of course, applicable for the reverse mode of operation.

The above description is given for the case where synchronization of VTR 1 is obtained with the reference time. However, if the time code from time code generator 5 is selected as the time code from master VTR 4, the editing operation can be carried out between VTRs 1 and 4. During the editing operation, master VTR 4 always transports the tape at normal speed in a capstan servo locked mode, so that the read-out time code therefrom can be used as the reference time.

In order to better understand the present invention, the tape editing operation will be described with reference to the graph of FIG. 3, in which the abscissa represents time and the ordinate represents the tape position (tape time), respectively. The solid line indicates the time code of master VTR 4 and the broken line indicates the time code of slave VTR 1, respectively In master VTR 4, the master tape is stopped at the following point in the time code:

$$P_{pk}=T_{cr}-\alpha$$

while in slave VTR 1, the original tape is stopped at the following point in the time code:

$$P_{pk}=T_{cx}-\alpha x$$

During the time period between times $T_0$ and $T_1$ in the graph of FIG. 3, the operation explained in connection with the flow chart of FIG. 2 is carried out. At time $T_1$, the read-out time code $T_x$ becomes $T_{cx}$ and the read-out time code $T_r$ becomes $T_{cr}$ and, at such time, the actual editing operation starts. In this case, the time period between times $T_0$ and $T_1$ is the pre-roll time.

Figure 3:
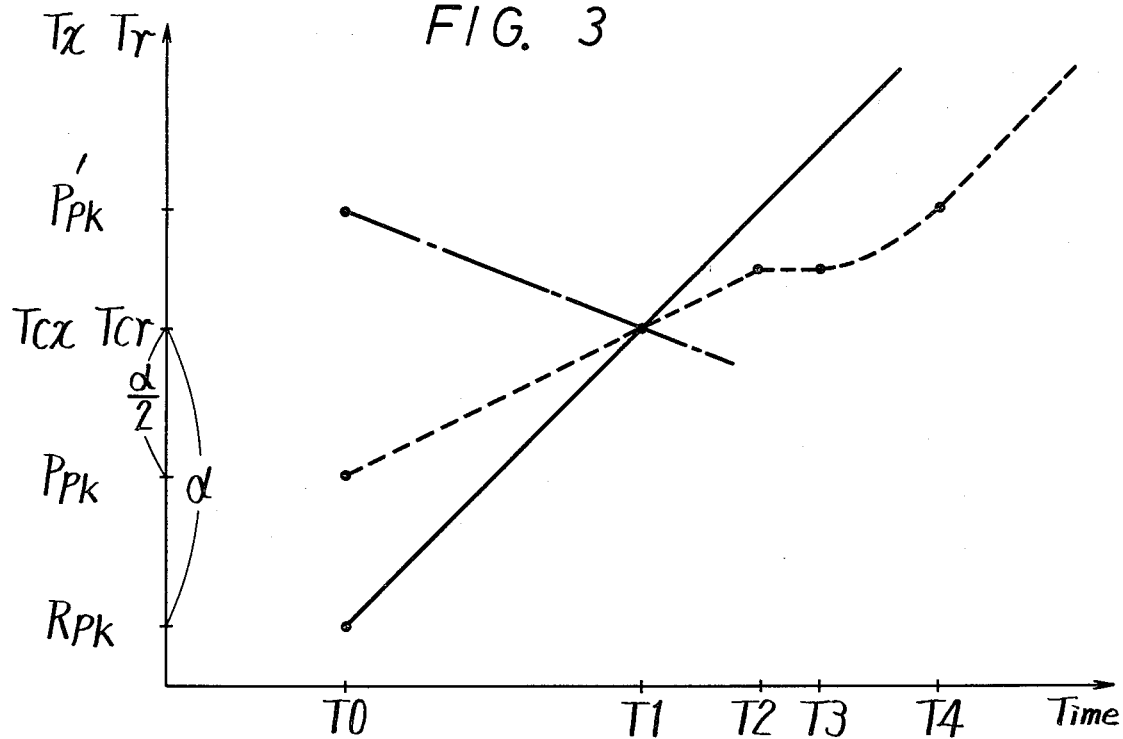
FIG. 3 is a graphical diagram showing the relationship between tape position and time during the tape editing operation with the apparatus of FIG. 1.

As described previously, since master VTR 4 always drives the master tape at the normal tape speed, $T_4$ increases at a constant rate, while VTR 1 drives the original tape at half the normal speed ($x=\frac{1}{2}$), in the example of FIG. 3 so that $T_x$ increases at half the constant rate along the time axis.

As will be apparent from the graph of FIG. 3, by selecting the pre-roll point of VTR 1 at $P_{pk}=T_{cx}-\alpha x$ and by setting the tape speed between times $T_0$ and $T_1$ at the tape speed ratio x times the normal tape speed, the starting times for movement of the tapes in both the master VTR 4 and slave or playback VTR 1 can be made coincident whereby the editing operation can be smoothly started at the in-point for each tape.

When the tape speed at the in-point is set in the reverse direction, it is sufficient to set the pre-roll point at a point $P_{pk}'$ following the in-point, as shown by the one-dot chain line in the graph of FIG. 3.

The present invention further has the advantage of being able to control the tape speed of VTR 1 after the in-point. In the example of FIG. 3, the original tape is driven in the forward direction such that the speed ratio x is selected so that $x = \frac{1}{2}$ between times $T_1$ and $T_2$, $x=0$ between times $T_2$ and $T_3$, x is varied along a predetermined curve from $x=0$ to $x=1$ between times $T_3$ and $T_4$, and $x=1$ after time $T_4$.

The above control is carried out as follows: Before the start of the practical or actual editing operation, a trial run is carried out. At this time, the tape speed of VTR 1 is controlled by search dial 14 while the operator watches the picture on monitor 12. At the same time, the movement or angular rotation of search dial 14 is sampled by a predetermined clock pulse and then stored in memory 9. After the above operation is repeated several times to provide a desired motional variation of picture, the actual operation is started. The angular rotation of search dial 14 is related to the speed ratio x, is stored in memory 9 and is sampled at every, for example, 0.1 second in association with the speed ratio x.

Thus, the output video signal from playback VTR 1, which can perform in any one of a plurality of special reproducing modes, can be synchronously reproduced and/or edited with the desired movement of the reproduced picture.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

We claim as our invention:

1. A video tape synchronizing system for a helical scan video tape recorder which uses a video tape having information signals and time code signals recorded thereon and which is adapted to reproduce said information signals from said video tape when the latter is moved at any one of a plurality of different speeds, comprising:

time code reader means for reading out said time code signals recorded on said video tape which is used in said helical scan video tape recorder;

selecting means for setting a direction and any one of said plurality of different speeds of movement of the video tape at an in-point, wherein said in-point indicates a starting point for playing back information signals recorded in said video tape; and control processing means for determining a pre-roll point at which said video tape is to be stopped by determining the distance between said in-point and said pre-roll point in response to said time code signals read out by said time code reader means which correspond to said in-point of said video tape and said set direction and said set one of said plurality of different speeds of movement of said video tape at said in-point, and for controlling said helical scan video tape recorder to stop said video tape at said pre-roll point.

2. A video tape synchronizing system according to claim 1, wherein said control processing means controls the helical scan video tape recorder to advance said tape from said pre-roll point towards said in-point in said set direction and at said set one of said plurality of different speeds of movement of said video tape.

3. A video tape synchronizing system according to claim 1, further including reference time generating means for generating a reference time code; and wherein said control processing means synchronizes the occurrence of said in-point of said video tape with a predetermined time of said reference time code generated by said reference time generating means by controlling said helical scan video tape recorder to slightly vary the running speed of said video tape from said set speed between said pre-roll point and said in-point.

4. A video tape synchronizing system according to claim 1, further including a master video tape recorder which uses a master video tape therein having reference time code signals recorded thereon and second time code reader means for reading out said reference time code signals from said master video tape; and in which said control processing means synchronizes the occurrence of said in-point of said video tape with a predetermined time in response to said reference time code signals read out by said second time code reader means and said time code signals read out by said first-mentioned time code reader means.

5. A video tape synchronizing system according to claim 1, further including memory means for storing data from said selecting means corresponding to a desired speed and direction of movement of said video tape after said in-point, and wherein the speed and direction of movement of said vidoe tape after said in-point is determined by data stored in said memory means.

6. A video tape synchronizing system according to claim 1, further including memory means for storing said time code signals corresponding to said in-point of said video tape, and wherein said control processing means supplies a tape running control signal to said video tape recorder in response to said time code signals stored in said memory means to control said video tape recorder to stop said video tape at said pre-roll point.

7. A video tape synchronizing system according to claim 6, further including control interface means for supplying said tape running control signal from said control processing means to said video tape recorder.

* * * * *